April 27, 1926.

W. WUERFEL 1,582,719

PISTON RING CONTRACTING APPARATUS

Filed August 25, 1925  3 Sheets-Sheet 1

April 27, 1926.
W. WUERFEL
PISTON RING CONTRACTING APPARATUS
Filed August 25, 1925   3 Sheets-Sheet 3
1,582,719
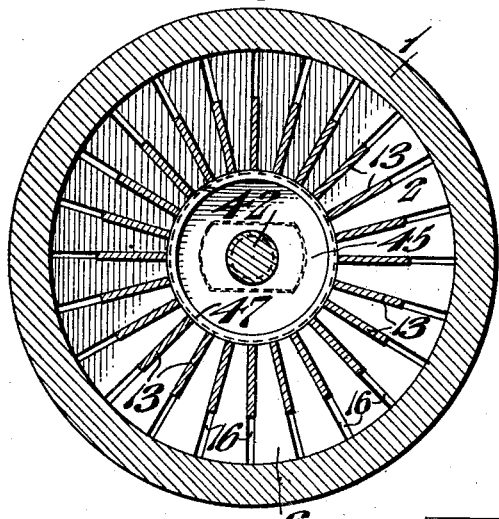
Fig. 3.
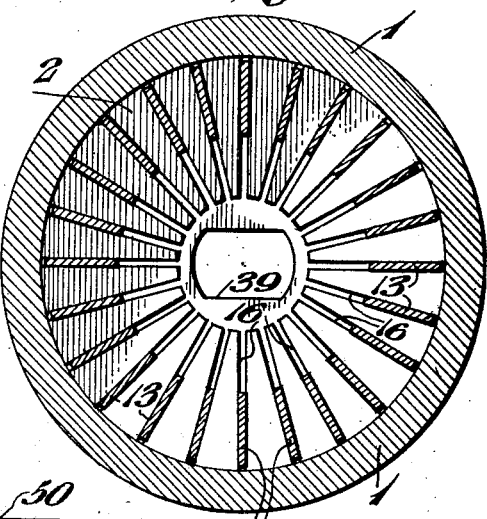
Fig. 4.
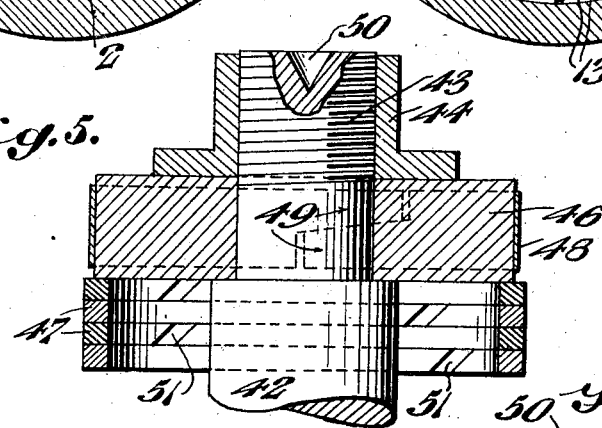
Fig. 5.
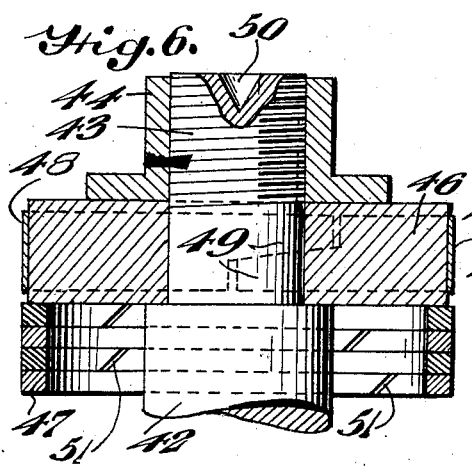
Fig. 6.
Fig. 7.
INVENTOR.
William Wuerfel
BY
ATTORNEYS.

Patented Apr. 27, 1926.

1,582,719

UNITED STATES PATENT OFFICE.

WILLIAM WUERFEL, OF PHILADELPHIA, PENNSYLVANIA, ASSIGNOR TO WILKENING MANUFACTURING COMPANY, OF PHILADELPHIA, PENNSYLVANIA, A CORPORATION OF DELAWARE.

PISTON-RING-CONTRACTING APPARATUS.

Application filed August 25, 1925. Serial No. 52,367.

*To all whom it may concern:*

Be it known that I, WILLIAM WUERFEL, a citizen of the United States, residing in the city and county of Philadelphia and State of Pennsylvania, have invented a new and useful Piston-Ring-Contracting Apparatus, of which the following is a specification.

My invention relates to a new and useful apparatus for contracting piston rings of the self expansive metallic type, and it relates more particularly to a novel apparatus of the character stated for contracting such piston rings in the course of the manufacture of the same, that is prior to the finishing of the outside peripheral surface thereof, as is well known in the art.

In the manufacture of metallic piston rings of the split and self expansive type, the piston rings are usually finished and split and then are finally finished on the outside peripheral surface, in the closed or contracted position of the rings, in order that a true outer cylindrical surface may be obtained to match the inner surface of the engine cylinder.

Self expansive piston rings are in general produced in one of two ways. One method is to cut the rings from a cylindrical tube, of a slightly larger diameter than the diameter of the cylinder which the rings are to fit, then to cut out a small portion of the rings, forming any suitable joint between the cut ends, and thereby permitting the contraction of the ring against the force or the resiliency of the material of the ring, to the required cylinder diameter. The other method of making piston rings is to cut the rings from a cylindrical tube of substantially the same diameter as the cylinder to be fitted, then to split the rings at one point without removing any substantial quantity of the material, and permanently to stretch or distend the rings to a larger diameter, so that when they are forced or sprung back to their normal "cylinder" diameter, they will maintain a certain amount of outward radial resilient force.

In each of these methods of making rings, it is desirable to obtain a last finishing cut, on the outer cylindrical surface whether on a lathe or on a grinder, after the ring has been otherwise finished, and in a contracted position, that is, in the same position that it would occupy within the cylinder, in order that it may have a true outer cylindrical surface.

My novel apparatus has for its object the accurate mounting of a series, or a large number, of split rings, upon a mandrel, in such a contracting position, with great facility and ease, and with the utmost accuracy.

A further object of my invention is to provide means, not only for contracting a series of piston rings, but also for accurately centering the same about a mandrel upon which they are to be mounted.

Still another object of my invention is to provide an apparatus for contracting piston rings which is universal, between wide limits, thus eliminating the necessity which has hitherto existed for a separate fixture for each size of ring.

With the above ends in view, my invention consists of an upright cylindrical housing, a series of radial bearing openings in said housing substantially equally spaced, plungers slidably mounted within said bearing openings, upright jaw-blades carried by the inner ends of said plungers, means carried by said housing for guiding the upper and lower ends of said blades, yieldable means normally to retain said plungers in an outermost position, a common cam ring surrounding said housing, adapted to engage the outer ends of said plunger, and to force the same inwardly when the cam ring is actuated and means to actuate said cam ring.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Referring to the drawings:—

Figure 3 represents a sectional plan view on line 3—3 of Figure 1, showing the apparatus in the closed position, with the mandrel and piston rings in place.

Figure 4 represents a section similar to that shown in Figure 3 with the apparatus in the open position and with the mandrel and piston rings removed therefrom.

Figure 5 represents a vertical section of a portion of the stack of piston rings and a mandrel prior to the contraction of the rings.

Figure 6 represents a section similar to that shown in Figure 5, with the piston rings contracted to a fixed diameter determined by a steel band or sizing ring surrounding the washer on the end of the mandrel.

Figure 7 represents a vertical section similar to that shown in Figures 5 and 6, with the steel ring or band removed and with the stack of piston rings in position ready for the finishing operation on a lathe or grinder.

Figure 1:
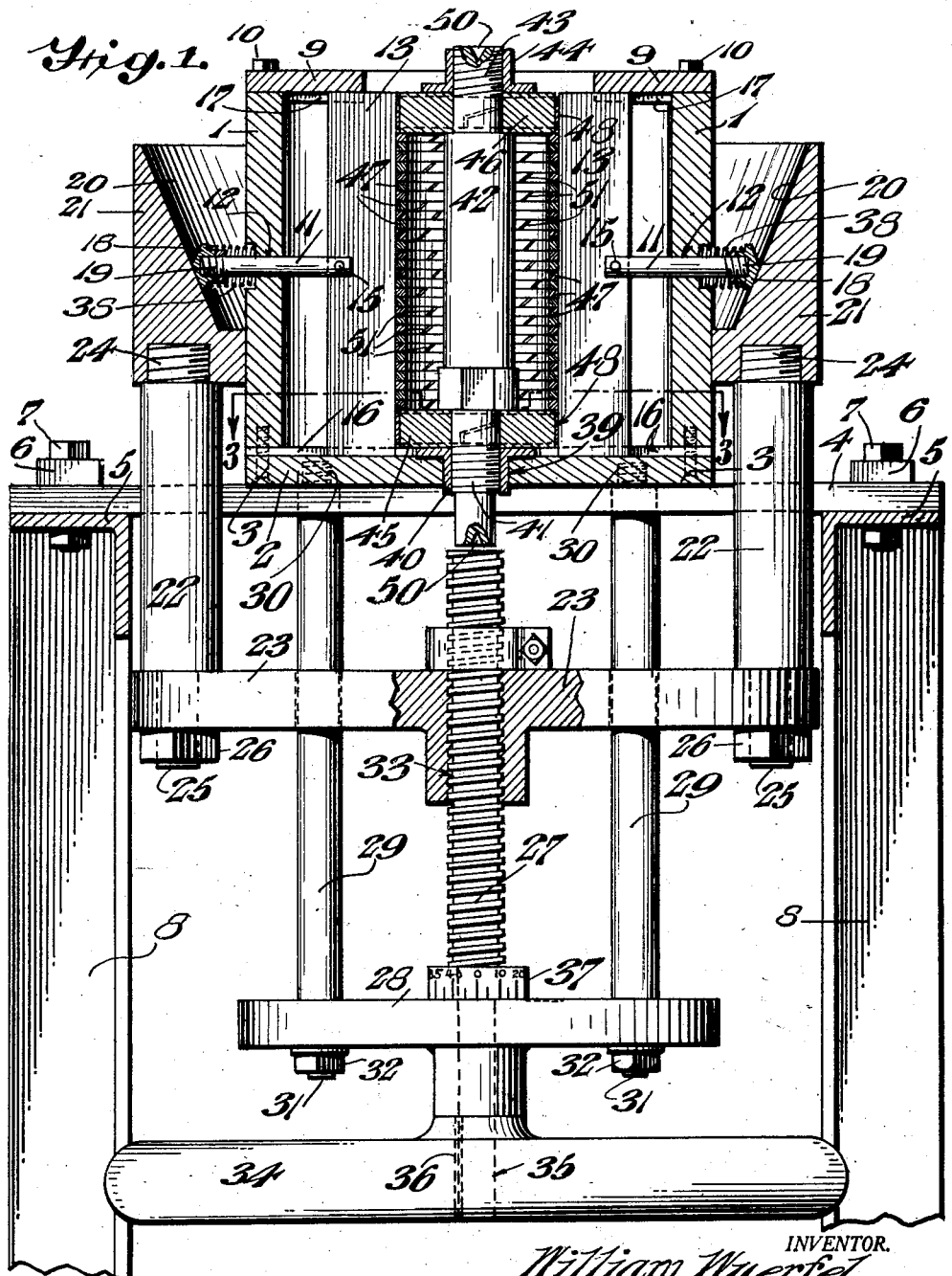
Figure 1 represents a vertical section of a novel piston ring contracting apparatus embodying my invention.

Referring to the drawings in which like characters indicate like parts, 1 designates the housing or shell of my novel apparatus preferably of cylindrical shape, positioned upright upon, and secured to, the bottom or lower guide plate 2, by means of a series of screws 3 or other fastening devices. The bottom guide plate 2 in turn and hence the whole apparatus, rests upon pairs of transverse supports 4, which are in turn carried by a longitudinal angle member 5, and clamped thereto, by means of suitable clamping devices 6 and bolts 7, as shown in Figures 1 and 2; which longitudinal angle members are in turn carried by upright supports 8, in any suitable manner.

The apparatus thus supported, consists chiefly of the housing 1, the lower guide plate 2, a corresponding upper guide plate 9, secured to the upper edge of the cylindrical housing 1 by means of bolts or other fastening devices 10, a series of radially disposed plungers 11, slidably mounted within suitably spaced radial openings 12, extending through the housing 1, and a series of upright jaw blades 13, carried by the inner ends of said plungers. The upright guide blades 13 are secured to the inner ends of the plunger 11 in any suitable manner, such as for instance, by inserting them into suitable slots 14 in the ends of said plungers, and fixing them therein by means of pins or rivets 15. The lower and upper ends of the jaw blades 13 are guided in suitable radial guide channels 16 and 17 respectively, in the inner surfaces of the lower and upper guide plates 2 and 9 respectively, as shown particularly in Figures 1, 3 and 4.

Figure 2:
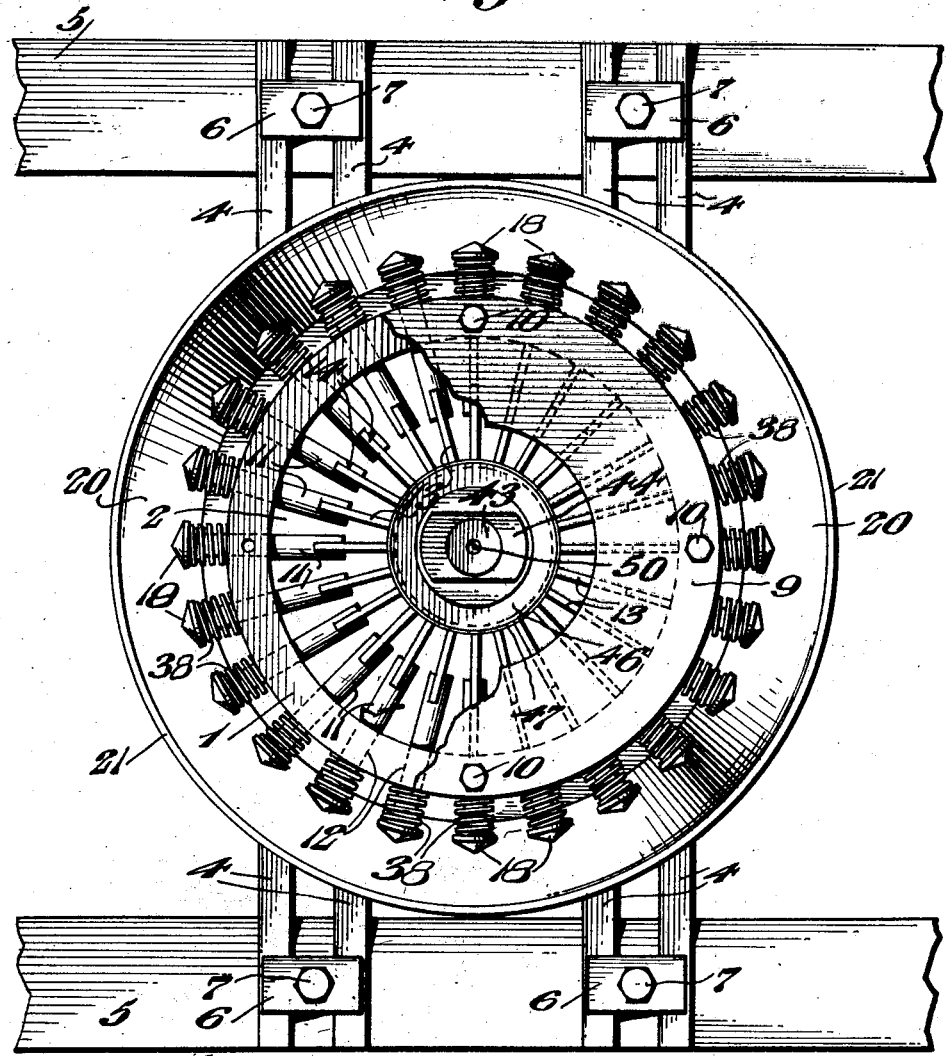
Figure 2 represents a plan view of my novel apparatus with the upper guide plate partly broken away, so as to expose to view the jaw-blades carried thereby.

In order to actuate the jaw blades 13 in a radial direction, the outer ends of the plungers are provided with the follower cam heads 18, threadedly secured thereto, as at 19, which follower heads 18 are suitably shaped, so as to be adapted to be engaged by the inner conical cam surface 20, of the annular cam ring 21 surrounding the housing 1, as shown particularly in Figures 1 and 2. The cam ring 21 is carried by a plurality of upright standards 22, from a transverse yoke 23 beneath the housing 1, as shown in Figure 1. The upright standards are threadedly secured to the cam ring 21 as shown at 24, and are in turn secured to the yoke 23 by passing the reduced and threaded ends 25 thereof through suitable openings in said yoke, and subsequently securing the nuts 26 upon the threaded ends 25.

In order to raise and lower the cam rings 21 at will, and in order to maintain the same in any desired position, thereby to actuate the jaws 13 of my novel apparatus, I provide a novel screw feed, shown particularly in Figure 1, in which the screw 27 is supported rotatably in the lower yoke 28, yet fixed therein against any vertical longitudinal movement, which yoke is in turn supported by the upright standards 29 depending from the lower guide plate 2, and secured thereto by means of the threaded ends 30, and secured to the lower yoke by means of the threaded ends 31 and the nuts 32. The feed screw 27 is threaded into a correspondingly threaded vertical opening 33, passing through the center of the upper yoke 23, thereby moving said upper yoke 23 and hence the cam ring 21 in a vertical direction whenever said feed screw 27 is turned.

In order to facilitate the manipulation of the screw 27, and hence the raising and lowering of the cam ring 21, and the corresponding closing and opening of the jaws 13, I provide an operating hand wheel 34, secured and keyed to the lower end 35 of the screw 27 by means of the key 36, whereby said screw may be readily revolved. I further provide a graduated index collar or dial 37, upon said screw, having suitable markings thereon, whereby the screw may be revolved predetermined amounts at will.

In order to withdraw the jaws 13 in an outward radial direction, when the cam ring 21 recedes downwardly, I interpose a compression spring 38 between each of the cam follower heads 18 of the plungers 11, and the outer wall of the casing 1, as shown particularly in Figures 1 and 2.

The lower guide plate 2 is provided with a central opening 39, of a suitable shape to receive and to retain against rotation, the lower nut 40, upon the lower threaded end 41, of the mandrel 42. The mandrel 42, having the reduced and threaded ends 41 and 43, carries a lower and an upper nut 40 and 44 respectively, threaded onto said ends, and the end discs or washers 45 and 46 respectively, inside of said nuts, between which, the series of piston rings 47 are clamped.

In using my novel apparatus the end discs or washers 45 and 46 are chosen of a slightly lesser diameter than the finished or contracted diameter of the particular rings, in order that a suitable clearance may be allowed between the outer periphery of the washer and the outer diameter of the piston rings, when mounting the piston rings 47 upon the mandrel 42. The relative proportions of the diameter of the end washers and the diameter of the piston rings in their "open" or distended positions, is clearly shown in Figure 5.

The mandrel 42 having mounted thereon the lower washer 45 and the nut 40, is inserted into the apparatus, with the nut 40 seated within the opening 39, in the lower guide plate 2; the jaws 13 of my novel apparatus being opened so as to permit free access to the same. A split metallic sizing ring 48 is then placed around the outer periphery of the lower washer 45, in a manner shown in Figure 1. The washers and the corresponding sizing rings or bands are so chosen that the outer diameter of the band when clamped against the washer, will be slightly greater than the diameter desired on the finished rings, the difference being the amount of the finishing cut. The piston rings 47 are then stacked up on the lower washer 45 in a manner shown in Figure 1, with the joints 51 of the piston rings staggered. The upper washer or end disc 46, is then placed in position on top of the stack of rings and is surrounded by a corresponding sizing ring 48. The upper nut 44 is then loosely turned on to the threaded end 43 of the mandrel 42. Thereafter the hand wheel 34 is revolved so as to raise the cam ring 21 until the jaws 13 have been closed in on the stack of piston rings 47 and the sizing rings 48. The sizing rings will then determine the closed diameter of the piston rings. Figure 6 shows the piston rings contracted to the diameter of the sizing rings 48.

Since the inner edges of the jaws 13 are true to a straight line, and since the effective outer diameters of the washers 45 and 46 and the sizing rings 48 are equal and predetermined, the whole stack of rings will be contracted to the same predetermined outer diameter. Furthermore, since the washers 45 and 46 are concentric, with the mandrel 42 centered in the lower plate 2, the piston rings will also be centered accurately about the mandrel 42, and hence centered with respect to its turning centers 50. Moreover, due to the relatively large number of jaws 13, (in the particular illustration shown, approximately twenty four), the piston rings will be contracted into a true circular shape, instead of being distorted into some polygonal shape, as would be the case, if but a few jaws were employed to contract the rings.

After the rings have been thus contracted to the desired diameter and concentrically about the mandrel 42, the upper nut 44 is tightened by a suitable wrench, thereby clamping and fixing the rings 47 between the two washers 45 and 46 in the contracted position. Thereafter the hand wheel 34 is revolved in the opposite direction so as to lower the cam rings and thereby releasing the jaws 13 into their outer or open position, thus permitting the removal of the mandrel 42 with the piston rings 47 mounted thereon in the manner stated. The sizing rings 48 are then removed from the washers 45 and 46 and the stack of rings is then mounted and ready for the finishing cut upon a lathe or grinder, as the case may be.

By my novel apparatus it is thus seen, the mounting of a stack or a large number of piston rings upon a mandrel is greatly facilitated and furthermore the mounting thereof is made more accurate and certain as to dimensions and centering.

My apparatus also has sufficient range of adjustment, to be used for piston rings of many different sizes, thus eliminating the necessity for the use of a different contracting fixture for each size of ring.

Furthermore, due to the large number of jaws or blades, a true circular shape is secured when the rings are contracted, thus eliminating any possibility of a slight polygonal distortion of the rings due to the uneven pressure on the outer diameter thereof at a few points. Moreover, it will be seen that since the contracting edges of the jaws of my novel apparatus are provided with straight edges, the several rings in the stack are necessarily contracted to a uniform diameter thus eliminating any irregularity in the finished product. The sizing rings may also be provided with the rabbetted ends 49, so as to secure the desired overlapping of such ends and hence a continuity of the sizing rings around the washers.

It will now be apparent that I have devised a novel and useful piston ring contracting apparatus which embodies the features of advantage enumerated as desirable in the statement of the invention and the above description, and while I have, in the present instance, shown and described preferred embodiments thereof which will give in practice satisfactory and reliable results, it is to be understood that such embodiments are susceptible of modification in various particulars without departing from the spirit or scope of the invention or sacrificing any of its advantages.

Having thus described my invention, what I claim as new and desire to secure by Letters Patent, is:—

1. In a device of the character stated, a housing having a plurality of bearing openings, plungers slidably mounted in said bearing openings extending through the wall of said housing, upright elongated jaw blades carried by said plungers within the housing and a cam ring surrounding said housing and adapted to engage the outer ends of said plungers thereby to force the same inwardly.

2. In a device of the character stated, a cylindrical housing, terminal guide plates secured to said housing, a plurality of radially disposed elongated jaw blades within said housing, extending substantially parallel to the axis thereof, and guided at their terminals by said guide plates, and means to actuate said jaw blades in unison.

3. In a device of the character stated, a cylindrical housing, terminal guide plates secured to said housing, a plurality of radially disposed elongated jaw blades within said housing, extending substantially parallel to the axis thereof, and guided at their terminals by said guide plates, a common cam ring surrounding said housing, and means intermediate said cam ring and each of said jaw blades, for actuating the latter in unison.

4. In a device of the character stated, a housing, a plurality of radially disposed jaws within said housing extending substantially parallel to the axis thereof, a mandrel disposed axially of said housing, and end discs carried by said mandrel near the terminals thereof, for limiting the inward movement of the said jaws, said mandrel being adapted to receive a stack of piston rings between said two end discs.

5. In a device of the character stated, a cylindrical housing, a plurality of radially disposed jaws within said housing extending substantially parallel to the axis thereof, a mandrel disposed axially of said housing, end discs carried by said mandrel near the terminals thereof, for limiting the inward movement of the said jaws, said mandrel being adapted to receive a stack of piston rings between said two end discs, and means to actuate said jaws in unison in an inward direction.

6. In a device of the character stated, a cylindrical housing, a plurality of radially disposed jaws within said housing extending substantially parallel to the axis thereof, a mandrel disposed axially of said housing, end discs carried by said mandrel near the terminals thereof and sizing bands surrounding each of said end discs for limiting the inward movement of said jaws, said mandrel being adapted to receive a stack of piston rings between said two end discs.

7. In a device of the character stated, a cylindrical housing having a plurality of spaced and radially disposed bearing openings extending therethrough, plungers slidably mounted in said bearing openings, elongated jaw blades carried by the inner ends of said plungers substantially parallel with the axis of said housing, common actuating means surrounding said housing and adapted to engage the outer ends of the plungers simultaneously to force the same inwardly in unison and yieldable means intermediate said plungers and said housing for urging said plungers outwardly.

8. In a device of the character stated, a cylindrical housing having a plurality of spaced and radially disposed bearing openings extending therethrough, plungers slidably mounted in said bearing openings, elongated jaw blades carried by the inner ends of said plungers substantially parallel with the axis of said housing, follower heads carried by the outer ends of said plungers, a cam ring surrounding said housing and adapted to engage each of said follower heads simultaneously, to force the said plungers inwardly and in unison, and yieldable means intermediate said follower heads and said housing for urging said plungers outwardly.

9. In a device of the character stated, a cylindrical housing having a plurality of spaced and radially disposed bearing openings extending therethrough, plungers slidably mounted in said bearing openings, elongated jaw blades carried by the inner ends of said plungers substantially parallel with the axis of said housing, common actuating means surrounding said housing and adapted to engage the outer ends of the plungers simultaneously to force the same inwardly, yieldable means intermediate said plungers and said housing for urging said plungers outwardly and an upper and a lower guide plate carried by said housing for guiding the terminals of said blades.

10. In a device of the character stated, a cylindrical housing having a plurality of spaced and radially disposed bearing openings extending therethrough, plungers slidably mounted in said bearing openings, elongated jaw blades carried by the inner ends of said plungers substantially parallel with the axis of said housing, follower heads carried by the outer ends of said housing, a cam ring surrounding said housing and adapted to engage each of said follower heads simultaneously, to force the said plungers inwardly in unison, yieldable means intermediate said follower heads and said housing for urging said plungers outwardly, terminal guide plates carried by said housing, and means thereon adapted to receive and guide the terminals of said jaw blades in radial directions.

11. In a device of the character stated, a cylindrical housing having a plurality of spaced and radially disposed bearing openings extending therethrough, plungers slidably mounted in said bearing openings, elongated jaw blades carried by the inner ends of said plungers substantially parallel with the axis of said housing, follower heads carried by the outer ends of said housing, a cam ring surrounding said housing, having an inner conical cam surface adapted to engage each of said follower heads simultaneously, to force the said plungers inwardly in unison, compression springs intermediate said follower heads and said housing for urging said plungers outwardly, and terminal guide plates carried by said housing and having radial guide channels therein adapted to receive and guide the terminals of said jaw blades in radial directions.

12. In a device of the character stated, a cylindrical housing, a plurality of radially disposed elongated jaws within said housing extending substantially parallel to the axis thereof, a cam ring surrounding said housing and adapted for movement axially thereof, means intermediate each of said jaws and said cam ring, whereby said jaws are moved radially with the axial movement of the ring, and rotary means for raising and lowering said cam ring axially of said housing.

13. In a device of the character stated, a cylindrical housing, a plurality of radially disposed elongated jaws within said housing extending substantially parallel to the axis thereof, a common cam ring surrounding said housing and adapted for movement axially thereof, means intermediate each of said jaws and said cam ring, whereby said jaws are moved radially with the axial movement of the ring and an axially disposed feed screw for actuating said cam ring axially of said housing.

14. In a device of the character stated, a cylindrical housing, a plurality of radially disposed elongated jaws within said housing extending substantially parallel to the axis thereof, a common cam ring surrounding said housing and adapted for movement axially thereof, means intermediate each of said jaws and said cam ring, whereby said jaws are moved radially with the axial movement of the ring, a rotatably mounted feed screw disposed axially of said housing, a transverse yoke engaging said feed screw and adapted to be actuated thereby, and means intermediate said yoke and said cam ring for actuating the latter with the revolution of said feed screw.

15. In a piston ring contracting apparatus, the combination of a cylindrical shell having a conical inner surface; a plurality of blades within said shell and substantially parallel with its axis; a plunger attached to each blade and engaging the conical inner surface of said shell; and means for moving said shell relative to said blades.

WILLIAM WUERFEL.